United States Patent
Brettner, III et al.

(10) Patent No.: US 6,812,885 B2
(45) Date of Patent: Nov. 2, 2004

(54) RADIO ALTIMETER TEST METHOD AND APPARATUS

(75) Inventors: William Howard Brettner, III, Goodyear, AZ (US); Robert Stebbins Doyle, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 259 days.

(21) Appl. No.: 10/155,587

(22) Filed: May 24, 2002

(65) Prior Publication Data

US 2004/0178949 A1 Sep. 16, 2004

(51) Int. Cl.$^7$ .............................. G01S 13/08; G01S 7/40
(52) U.S. Cl. ................... 342/173; 342/118; 342/120; 342/122; 342/165
(58) Field of Search .................. 342/118–122, 165–174, 342/195

(56) References Cited

U.S. PATENT DOCUMENTS

| 4,714,928 A | * | 12/1987 | Schmitt ...................... 342/174 |
| 4,945,360 A | * | 7/1990 | Trummer et al. ........... 342/122 |
| 5,072,223 A | * | 12/1991 | Hethuin et al. ............. 342/122 |
| 5,160,933 A | * | 11/1992 | Hager ....................... 342/174 |
| 6,476,759 B2 | * | 11/2002 | Orlandi ..................... 342/122 |

* cited by examiner

*Primary Examiner*—Bernarr E. Gregory

(57) ABSTRACT

A method, apparatus and circuit for testing a radio altimeter is disclosed. During the test-mode operation of the altimeter, a signal processor controls a transmitter to generate a radio frequency signal at a first period of time, which is transmitted through an attenuator, transmitted then through a receiver and received by the signal processor at a second period of time for processing of altimeter operational information.

32 Claims, 2 Drawing Sheets

RADIO ALTIMETER TEST METHOD AND APPARATUS

FIELD OF INVENTION

The present invention relates to aircraft avionics, and more particularly to aircraft radio altimeter test methods, apparatus and circuits.

BACKGROUND OF THE INVENTION

Altimeters are a required instrument for most commercial or military aircraft. Altimeters function to allow the pilot to determine altitude (e.g., how far the aircraft is above the earth's surface). Various types of altimeters exist, such as barometric altimeters (which rely on air pressure), radar altimeters (which rely on radio wave signals), frequency modulated (FM) altimeters and pulsed radio altimeters.

A typical radio altimeter works, for example, by transmitting or propagating a single radio frequency (RF) signal from the aircraft to the earth. The speed of the emitted radio frequency signal transmitted from the altimeter is a known value (e.g., the speed of light which is a known constant, or, approximately 299,792,458 meters per second). The emitted signal then reflects off the earth's surface and returns to the aircraft at the same speed. The radio altimeter's receiver receives the reflected signal, and, based upon the time the signal was transmitted from the aircraft to the time the signal was received by the radio altimeter, an altitude can be calculated. Radio altimeters, however, are not designed to operate at high altitudes. Radio altimeters do not typically operate at higher altitude because it is difficult to receive a signal reflected from the earth's surface at the high altitudes aircraft fly. Thus, most radio altimeters are designed to operate closer to the vicinity of an earth surface, and more particularly, for example, at altitudes of 2,500 feet or less. As is known in the art, radio altimeters are an important flight instrument when the aircraft takes off as well as when the aircraft is in the process of landing.

The radio altimeter, however, may malfunction during operation. Because the radio altimeter only typically operates when the aircraft is close to the earth surface (e.g., at altitudes of 2,500 feet or less), there is no current method in which to test the operation of the radio altimeter while in flight at altitudes above 2,500 feet. Many of the radio altimeter's components (e.g., such as transmission cables, antennas, processing means, the transmitter, the receiver and the like) could fail while in flight or even on the ground for various reasons. As such, it is necessary to calibrate the radio altimeter for proper operation.

It is therefore desirable to produce a test method and apparatus which tests the radio altimeter's overall operational stability at any time, regardless of whether the aircraft is in flight or not, which results in a more accurate altimeter reading so that the aircraft achieve higher reliability and safety.

SUMMARY OF THE INVENTION

The following summary of the invention is provided to facilitate an understanding of some of the innovative features unique to the present invention, and is not intended to be a full description. A full appreciation of the various aspects of the invention can only be gained by taking the entire specification, claims, drawings, and abstract as a whole.

The present invention concerns a radio altimeter apparatus and method of testing a radio altimeter apparatus. In one embodiment, the present invention includes a radio altimeter having at least one signal processor in communication with a radio frequency (RF) transmitter, a transmit coupler in communication with the RF transmitter, a transmit switch in communication with the transmit coupler, a first load in communication with the transmit switch, a transmit antenna in communication with the transmit switch, a receive antenna, a receive switch in communication with the receive antenna, a second load in communication with the receive switch, a receive coupler in communication with the receive switch, a receiver in communication with both the receive coupler and the signal processor, and a variable attenuator in communication with the transmit coupler, the receive coupler and the signal processor.

In one embodiment, the present test method encompasses transmitting a RF signal internally through the altimeter at full power and evaluating the performance of the altimeter, which may be useful in aircraft auto land (e.g., aircraft landing automatically by instrument) procedures.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figure further illustrates the present invention and, together with the detailed description of the invention, serve to explain the principles of the present invention.

DETAILED DESCRIPTION

Figure 1:
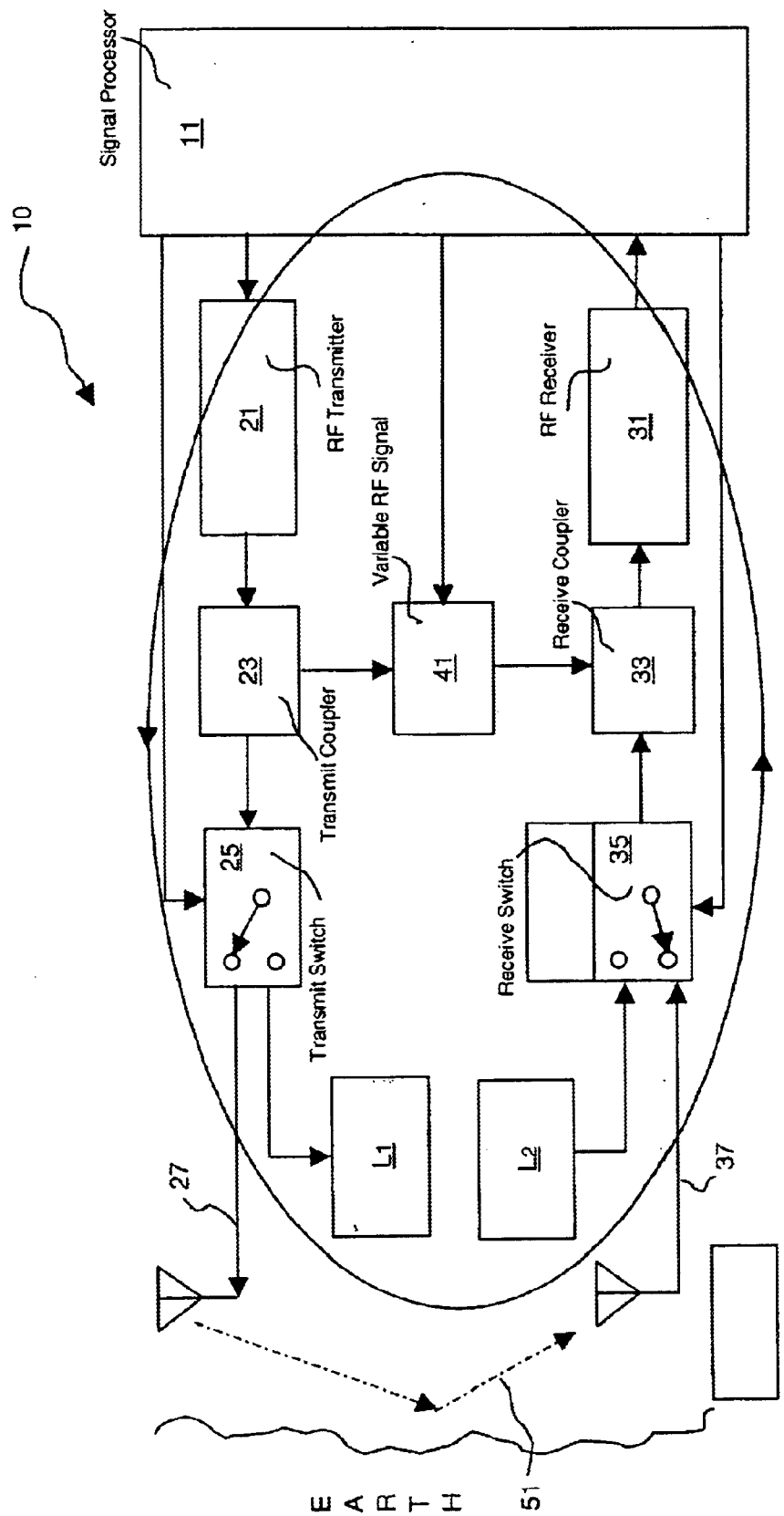
FIG. 1 depicts a block diagram of the present invention, illustrating the normal mode path of the RF signal.

Referring to FIG. 1, one embodiment of the present invention includes a radio altimeter 10 having a signal processor 11 in communication with a RF transmitter 21, a transmit coupler 23 in communication with the RF transmitter 21, a transmit switch 25 in communication with the transmit coupler 23 and the signal processor 11, a first load L1 in communication with the transmit switch 25, a transmit antenna 27 in communication with the transmit switch 25, a receive antenna 37, a receive switch 35 in communication with the receive antenna 37 and the signal processor 11, a second load L2 in communication with the receive switch 35, a receive coupler 33 in communication with the receive switch 35, a RF receiver 31 in communication with both the receive coupler 33 and the signal processor 11. The present invention, as seen in FIG. 1, further introduces a variable RF signal attenuator 41 which communicates with the transmit coupler 23, the receive coupler 33 and the signal processor 11.

In operation, an operator may control the altimeter's signal processor to operate in a normal mode condition or a test mode condition. In the altimeter's normal mode of operation, signal processor 11 communicates with and controls the RF transmitter 21 to generate a pulsed RF signal to the transmit coupler 23 at a first point in time. Typically, the RF signal generated may be in the range of approximately 4.0 to 5.0 Gigahertz frequency. The RF signal is then transmitted or propagated to the transmit switch 25. During normal mode operation, the signal processor 11 controls the transmit switch 25 to a substantially closed position and the attenuator 41 to a substantially open (or, highly attenuated) position, so that the RF signal can be transmitted though the transmit switch 25 to transmit antenna 27 to a surface on the earth. Those of skill in the art will appreciate that due to the characteristics of high frequency radio signals, an electrical device (such as an RF switch) may be controlled to be in an open position, however, some RF signal leakage may still exist.

After the RF signal is transmitted to the earth, it is reflected off the earth surface (as illustrated by line 51 in FIG. 1). The receive antenna 37 receives the reflected signal 51 which is then transmitted to receive switch 35. The reflected signal 51 is then transmitted from the receive switch 35 to the receive coupler 33 and thereafter, the RF signal is transmitted through the receive coupler 31 to the signal processor 11 at a second point in time. The range performance of a radio altimeter is usually proportional to the transmitter power and receiver sensitivity. As such, signal processor 11 is configured or otherwise programmed to process the reflected signal 51 to obtain the time delay between transmission of the RF signal and reception of the RF signal to obtain a value representing the delay, which is stored in the signal processor 11. Thus, in one embodiment, the signal processor 11 may use the first point in time and the second point in time to obtain a normal value representing the delay when the altimeter is operated in normal mode. Signal processor 11 may further be configured to process the reflected signal 51 to obtain other normal mode altimeter data (such as, for example, the RF signal's amplitude, the signal's pulse width, the signal's frequency, the transmitter power characteristics, the receiver sensitivity characteristics, antenna gain, cable losses, reflective properties of the earth, path loss and like altimeter processing functions which allow an operator to distinguish a true RF signal reflected from an earth surface from a false RF signal).

Figure 2:
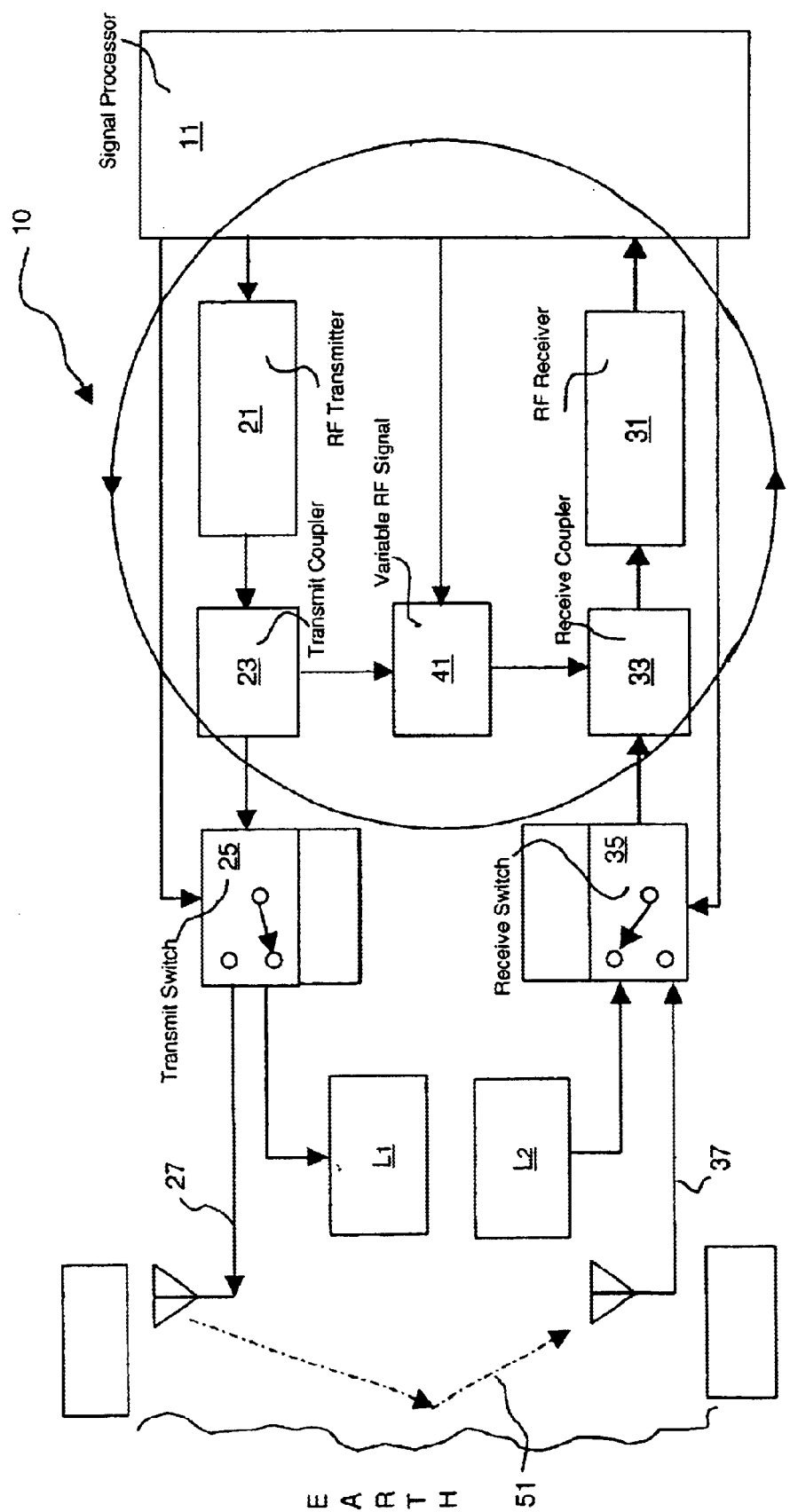
FIG. 2 depicts a block diagram of the embodiment shown in FIG. 1, illustrating the test mode path of the RF signal.

Alternatively, according to another aspect of the present invention, the operator may control the altimeter to operate in a self-test mode as illustrated in FIG. 2. In the self test mode, the signal processor 11 operates substantially in the same manner as it did during the normal mode as described previously. However, in the self-test mode, the signal processor controls the transmit switch 25 and the receive switch 35 to communicate or electrically couple with the first load L1 and the second load L2, while simultaneously, electrically disconnecting from the transmit antenna 27 and the receive antenna 37. High frequency RF signals may have the tendency to leak from devices or components if not properly terminated. Thus, in the self-test mode, the present invention employs a first load L1 and a second load L2 to properly terminate any excessive or leaking RF signal that may occur from redirecting the RF signal from the transmit and receive antennas 27, 37 to the attenuator 41. Additionally, the signal processor 11 controls the attenuator 41 to exhibit a much smaller attenuation value to allow the transmitted RF signal to flow through the attenuator 41 and to the receiver coupler 33. The transmitted RF signal is then communicated to the receiver 31 and back to the signal processor 11 for self-test processing. Again, signal processor 11 is configured or otherwise programmed to process the test signal to obtain the time delay between transmission of the test RF signal and reception of the test RF signal to obtain a value representing the test time delay, which is stored in the signal processor 11. Thus, in one embodiment, the signal processor 11 may use a first test point in time and a second test point in time to obtain a value representing the test time delay. Signal processor 11 may further be configured to process the test signal to obtain other altimeter test data (such as, for example, the RF test signal's amplitude, the test signal's pulse width, the test signal's frequency, the transmitter power characteristics, the receiver sensitivity characteristics, antenna gain, cable losses, path losses and like altimeter processing functions which are capable of distinguishing a true test RF signal from a false test RF signal). In another embodiment, the signal processor may also compare or otherwise process the data from the normal mode operation with the data from the test-mode operation to obtain additional information regarding the altimeter's performance. As will now be recognized, the present invention provides a simple, yet non-intrusive or non-invasive, form of testing the altimeter's performance.

One problem with formulating a test to measure the altimeter's operational stability resides when the aircraft is on the ground (such as, for example, when the aircraft is being serviced). Because the present invention works in the RF frequency range (such as, for example, between 4.0 and 5.0 Gigahertz), and because it is desirable to locate most or all of the components of the present invention in a compact fashion or in close proximity (such as on a single microchip or circuit board), there is no adequate method to completely or entirely prevent the RF signal from being transmitted through the transmit antenna by simply turning off the transmit switch during the test. As noted previously, those of skill in the art may refer to this as leakage. Thus, when an operational (e.g., internal) test is executed on the altimeter, the receive antenna may pick up extraneous RF signals emitted by the transmit antenna (leakage) which may reflect off the tarmac, ground or other nearby surface. Because the aircraft is so close to such a surface, the extraneous RF signals are quickly received by the receive antenna and may be at high signal strength. Thus, when the aircraft is on the ground during test, the transmitted test signal should be greatly attenuated to prevent ancillary signals from reflecting quickly off the nearby earth or runway surface. This invention minimizes RF signal leakage so that the performance of the altimeter can be verified on the ground during initial installation or maintenance of the altimeter system.

The present invention may encompass various embodiments and/or components. In one embodiment, the transmit coupler 23 may be a microstrip stripline or other coupler having a predefined attenuation setting, such as for example, about 25 dB. Further, as described above, the signal processor 11 also controls the attenuator 41 (such as, for example, a step attenuator) to characteristically exhibit a large attenuation so that the transmitted RF signal does not flow through the attenuator 41 in certain operation modes. Thus, in one embodiment, the signal processor 11 may control the attenuator 41 to be more than 20 dB less than the smallest amplitude RF signal expected to be reflected from the earth's surface.

Likewise, both transmit switch 25 and receive switch 35 may be single pole, double throw pin diode switches known to those of skill in the art. Switches 25 and 35 could also include a gallium arsenide switch if desired. One purpose of the transmit switch 25 is to provide the transmitted RF signal to the transmit antenna 27 when the altimeter 10 is operating in normal mode as controlled by the signal processor 11, and send the transmitted RF signal to the first load L1 when the altimeter 10 is operating in self-test mode as controlled by the signal processor 11. When the transmitted RF signal is sent to the load during the self-test mode, the load is configured to dissipate any excessive RF signal by thermodynamic action known to those of skill in the art. Similarly, one purpose of the receive switch 35 is to provide the reflected RF signal to the receive coupler 33 when the altimeter 10 is operating in normal mode as controlled by the signal processor 11, and send any reflected or spurious RF signal to the second load L2 when the altimeter 10 is operating in self-test mode as controlled by the signal processor 11. During the self-test mode, the signal processor 11 controls receive switch 35 to communicate with a second load L2 that characteristically exhibits the type of load (or matching impedance) expected by the receiver during the altimeter's normal operation, again, known to those of skill in the art.

The benefits of the present invention are numerous. In various embodiments, the present invention provides a single frequency altimeter capable of generating an internal self-test by using an internal RF loop test within the equipment. Further, the test can measure other characteristics within the altimeter, such as testing cables, antennas, radio receivers, radio transmitters and the like, whether during aircraft flight or while the aircraft is on the ground. Moreover, the present invention allows for internal testing of transmitter power characteristics and receiver sensitivity characteristics.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of an altimeter test method, apparatus and circuit, is followed.

What is claimed is:

1. A method for testing an altimeter, the method comprising the steps of:
   generating a test RF signal with a processor in a test mode at a first point in time;
   providing the test RF signal to an attenuator while at least substantially preventing transmission of the test RF signal to a transmit antenna;
   transmitting the test RF signal from the attenuator to a receive coupler while at least substantially preventing reception of undesired RF signals by the receive coupler;
   receiving the test RF signal at the processor at a second point in time; and
   processing the test RF signal to obtain altimeter test mode operational data.

2. The method of claim 1, wherein said processing step comprises processing the first point in time and the second point in time to obtain a value representing test time delay.

3. The method of claim 2, wherein the altimeter test mode operational data comprises an amplitude, a pulse width and a frequency of the test RF signal, and wherein the operational data comprises transmitter power information, receiver sensitivity information, antenna gain information, cable loss information, path loss information and information distinguishing a true test RF signal from a false test RF signal.

4. The method of claim 1, wherein the attenuator has an attenuation value to allow the transmitted test RF signal to pass therethrough.

5. The method of claim 4, the step of at least substantially preventing transmission of the test RF signal to the transmit antenna further comprising the steps of controlling a transmit switch to communicate with a first load, and controlling a receive switch to communicate with a second load, and wherein the transmit switch is at least substantially noncommunicative with the transmit antenna, and wherein the receive switch is at least substantially noncommunicative with a receive antenna.

6. The method of claim 4, the step of providing the test RF signal further comprising the steps of coupling a transmit switch to a first load, and coupling a receive switch to a second load, wherein the second load is configured to exhibit a matching impedance expected by receiver during the normal operation of the altimeter.

7. The method of claim 4 further comprising the steps of:
   generating an RF signal with the processor in a normal mode;
   providing the RF signal to a transmit antenna while at least substantially preventing transmission of the RF signal through the attenuator;
   transmitting the RF signal toward an earth surface;
   receiving the RF signal reflected from the earth's surface; and
   processing the received RF signal to obtain altimeter normal mode operational data.

8. The method of claim 7 further comprising step of configuring the processor to process the normal mode operational data with the test mode operational date.

9. The method of claim 8, further comprising the step of processing the first point in time and the second point in time to obtain a value representing test time delay.

10. The method of claim 9, wherein the attenuator has an attenuation value to at least substantially prevent the RF signal from flowing therethrough.

11. A method of testing a radio altimeter, the steps comprising:
   in a normal mode, controlling a radio frequency (RF) transmitter with a processor to generate an RF signal, transmitting the RF signal to a transmit coupler, transmitting the RF signal to a transmit switch controlled by the processor while at least substantially preventing transmission of the RF signal from an attenuator in communication with the transmit coupler, transmitting the RF signal to a surface through a transmit antenna in communication with the transmit switch, receiving the RF signal by a receive switch through a receive antenna in communication with the receive switch, transmitting the RF signal to a receive coupler in communication with the receive switch and the attenuator, transmitting the RF signal to a RF receiver, and transmitting the RF signal to the processor for processing altimeter normal mode operational data; and
   in a test mode, generating a RF signal by the processor transmitting the RF signal to the transmit coupler and to the attenuator while at least substantially preventing transmission of the RF signal to the transmit antenna, transmitting the RF signal to the receiver coupler, transmitting the RF signal to the RF receiver and to the processor while at least substantially preventing reception of undesired RF signals by the receive coupler, and processing altimeter test mode operational data at the processor.

12. The method of claim 11, wherein both the altimeter normal mode and the test mode operational data comprise an amplitude, a pulse width and a frequency of the test RF signal, and wherein the operational data further comprises transmitter power information, receiver sensitivity information, antenna gain information, cable loss information, path loss information and information distinguishing a true test RF signal from a false test RF signal.

13. The method of claim 12 further comprising the stop of processing the normal mode operational data with the test mode operational data.

14. The method of claim 13, the attenuator having an attenuation value in normal mode operation to at least substantially prevent the RF signal from flowing therethrough.

15. The method of claim 14, the attenuator having an attenuation value in test mode operation to allow the transmitted RF signal to flow therethrough.

16. The method of claim 13 wherein the step of at least substantially preventing transmission of the RF signal to the transmit antenna further includes the steps of coupling the transmit switch to a first load and transmitting a portion of the RF signal received by the transmit switch to the first load.

17. The method of claim 12, the step of at least substantially preventing transmission of the RF signal to the transmit antenna further comprising the steps of controlling the transmit switch to communicate with a first load and the receive switch to communicate with a second load, wherein the transmit switch is at least substantially noncommunicative with the transmit antenna and the receive switch is at least substantially noncommunicative with the receive antenna.

18. The method of claim 12, the step of transmitting the RF signal to the transmit coupler and to the attenuator further including the steps of coupling a transmit switch to the transmit coupler and a first load and coupling a receive switch to a second load, wherein the second load is configured to exhibit at least a substantially matching impedance expected by the receiver during the normal operation of the altimeter.

19. A radio altimeter comprising:
a radio frequency (RF) signal processor operatively coupled to a controllable transmitter;
a transmit coupler in communication with the transmitter;
a controllable transmit switch in communication with the transmit coupler and a first load, the signal processor controlling the transmit switch;
a transmit antenna in communication with the transmit switch;
a receiver in communication with the signal processor;
a receive coupler in communication with the receiver;
a controllable attenuator in communication with the transmit coupler and the receive coupler, the signal processor controlling the attenuator;
a controllable receive switch in communication with the receive coupler and a second load, the signal processor controlling the receive switch; and
a receive antenna in communication with the receive switch.

20. The altimeter of claim 19 wherein the attenuator is a step attenuator.

21. The altimeter of claim 20, the processor being configured to control the RF transmitter to generate a RF signal at a first point in time and to receive the RF signal at a second point in time.

22. The altimeter of claim 21, the altimeter configured to allow an operator to choose normal mode operation, and alternatively, test mode operation, the processor configured to process altimeter normal mode operational data and altimeter test mode operational data.

23. The altimeter of claim 22, both the altimeter normal mode and test mode operational data comprising an amplitude, a pulse width and a frequency of the test RF signal, the operational data further comprising transmitter power information, receiver sensitivity information, antenna gain information, cable loss information, path loss information and information indicative of distinguishing a true test RF signal from a false test RF signal.

24. The altimeter of claim 23, the attenuator characteristically having a high attenuation value in normal mode operation to at least substantially prevent the RF signal from flowing therethrough, the attenuator characteristically having a low attenuation value during test mode operation to allow the transmitted RF signal to flow therethrough.

25. The altimeter of claim 24, the processor further configured to control the transmit switch to communicate with a first load, the receive switch to communicate with a second load, the transmit switch being at least substantially noncommunicative with the transmit antenna and the receive switch being at least substantially noncommunicative with the receive antenna.

26. The altimeter of claim 25, the second load configured to characteristically exhibit a matching impedance expected by the receiver during normal mode operation.

27. The altimeter of claim 26, the processor further configured to redirect any portion of the RF signal received by the transmit switch to the load during test mode operation.

28. In a radio altimeter having a signal processor in communication with a radio frequency (RF) transmitter, a transmit coupler in communication with the RF transmitter, a transmit antenna in communication with the transmit coupler and a receiver in communication with the signal processor and a receive antenna, a circuit comprising a transmit switch coupled between the transmit coupler and the transmit antenna, the transmit switch in communication with a first load, a receive switch in communication with a second load and the receive antenna, a receive coupler in communication with the receive switch and the receiver, and a controllable attenuator in communication with the transmit coupler and the receive coupler.

29. The circuit of claim 28, the altimeter configured to allow an operator to chose normal mode operation, and alternatively, test mode operation, the processor configured to process altimeter normal mode operational data and altimeter test mode operational data.

30. The circuit of claim 29, both the altimeter normal mode and test mode operational data comprising an amplitude, a pulse width and a frequency of the test RF signal the operational data further comprising transmitter power information, receiver sensitivity information, antenna gain information, cable loss information, path loss information and information indicative of distinguishing a true test RF signal from a false test RF signal.

31. The circuit of claim 30, the attenuator characteristically having a high attenuation value in normal mode operation to at least substantially prevent the RF signal from flowing therethrough, the attenuator characteristically having a low attenuation value during test mode operation to allow the transmitted RF signal to flow therethrough.

32. The circuit of claim 31, the processor further configured to control the transmit switch to communicate with a first load, the receive switch to communicate with a second load, the transmit switch being at least substantially noncommunicative with the transmit antenna and the receive switch being at least substantially noncommunicative with the receive antenna, the second load configured to characteristically exhibit a matching impedance expected by the receiver during mode normal operation.

* * * * *